US009165068B2

(12) United States Patent
Winter et al.

(10) Patent No.: US 9,165,068 B2
(45) Date of Patent: Oct. 20, 2015

(54) TECHNIQUES FOR CLOUD-BASED SIMILARITY SEARCHES

(75) Inventors: Sven Winter, San Jose, CA (US); Jonathan Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 273 days.

(21) Appl. No.: 13/566,718

(22) Filed: Aug. 3, 2012

(65) Prior Publication Data
US 2014/0040262 A1 Feb. 6, 2014

(51) Int. Cl.
G06F 17/30 (2006.01)

(52) U.S. Cl.
CPC .... *G06F 17/30778* (2013.01); *G06F 17/30271* (2013.01); *G06F 17/30858* (2013.01); *G06F 17/30961* (2013.01)

(58) Field of Classification Search
CPC .......... G06F 17/3071; G06F 17/30864; G06F 17/30598
USPC ............. 707/3, 737, 772, 738, 741, 763, 764; 382/162, 173, 218, 118, 229, 305, 353, 382/224, 226; 705/39
See application file for complete search history.

(56) References Cited

U.S. PATENT DOCUMENTS

| 7,251,637 | B1* | 7/2007 | Caid et al. ........................ 706/15 |
| 7,606,762 | B1* | 10/2009 | Heit ................................ 705/39 |
| 7,672,976 | B2* | 3/2010 | Tobin et al. ............ 707/999.107 |
| 8,060,522 | B2* | 11/2011 | Birdwell et al. ............... 707/764 |
| 8,285,658 | B1* | 10/2012 | Kellas-Dicks et al. ......... 706/20 |
| 8,295,597 | B1* | 10/2012 | Sharma et al. ................. 382/173 |
| 8,352,494 | B1* | 1/2013 | Badoiu .......................... 707/772 |
| 2007/0239694 | A1* | 10/2007 | Singh et al. ....................... 707/3 |
| 2010/0027895 | A1* | 2/2010 | Noguchi et al. .............. 382/224 |
| 2010/0106713 | A1* | 4/2010 | Esuli et al. ..................... 707/716 |
| 2010/0332475 | A1* | 12/2010 | Birdwell et al. .............. 707/737 |
| 2011/0085739 | A1* | 4/2011 | Zhang et al. .................. 382/218 |
| 2011/0221769 | A1* | 9/2011 | Leung et al. .................. 345/633 |
| 2012/0250984 | A1* | 10/2012 | Taylor .......................... 382/162 |
| 2012/0314962 | A1* | 12/2012 | Holland et al. ............... 382/218 |
| 2013/0054603 | A1* | 2/2013 | Birdwell et al. .............. 707/738 |
| 2013/0151535 | A1* | 6/2013 | Dusberger et al. ............ 707/747 |

* cited by examiner

*Primary Examiner* — Mariela Reyes
*Assistant Examiner* — Thong Vu
(74) *Attorney, Agent, or Firm* — Shook, Hardy & Bacon L.L.P.

(57) ABSTRACT

Techniques for facilitating a similarity search of digital assets (e.g., audio files, image files, video files, etc.) are described. Consistent with some embodiments, a cloud-based search service manages one or more search tree data structures for use in organizing digital assets to make the digital assets searchable. Each digital asset is associated with a feature vector based on the various attributes and/or characteristics of the digital asset. The digital assets are then assigned to leaf nodes in one or more search tree data structures based on a measure of the distance between the feature vector of the digital asset and a virtual feature vector associated with a leaf node. When a search for similar digital assets is invoked, a prioritized breadth first search of a search tree is performed to identify the digital assets having the feature vectors closest in distance to the reference digital asset.

21 Claims, 9 Drawing Sheets

TECHNIQUES FOR CLOUD-BASED SIMILARITY SEARCHES

TECHNICAL FIELD

The present disclosure generally relates to data processing systems. More specifically, the present disclosure relates to methods, systems and computer program products that facilitate searching for a set of digital assets (e.g., image, video, or audio files) that are similar to a target or reference digital asset.

BACKGROUND

Conventional web-based search engines make it possible to quickly search enormous quantities of online documents for those that are most relevant by simply doing a keyword search. Keyword searching is effective for large-scale systems due in large part to the document indexing (sometimes referred to as web indexing) that is performed ahead of processing an actual search. In general, document indexing, or web indexing, involves collecting, parsing, and storing data in a particular format to facilitate fast and accurate information retrieval. When a user performs a keyword search to find relevant documents, the search engine utilizes an index to very efficiently identify the set of documents that contain all or part of the user-provided keywords. These documents can then be ranked using various algorithms and presented to the user as search results.

While document indexing is effective for document searching, when it comes to image searching, and in particular, searching a large corpus of images for those images that are similar to a reference or target image (e.g., an image similarity search), indexing by itself may not always provide the best user experience and/or yield acceptable or good results. This is due at least in part to the difference between finding exact matches, as is done with keyword searching when a particular word is identified as being included within a document, and finding attributes that may not be an exact match but are near matches (e.g., similar). If too many image attributes are used to determine similarity, the search engine will become less efficient as the number of images increases, and thus lack scalability. In addition, a particular search may yield too few results to be useful to the user because too few of the specific image attributes or factors will exactly match. However, if too few image attributes are used to determine similarity, then the relevance of the search results will suffer, and once again, the search results will not be useful to the user.

DESCRIPTION OF THE DRAWINGS

Some embodiments of the invention are illustrated by way of example and not limitation in the figures of the accompanying drawings, in which.

DETAILED DESCRIPTION

Figure 1:
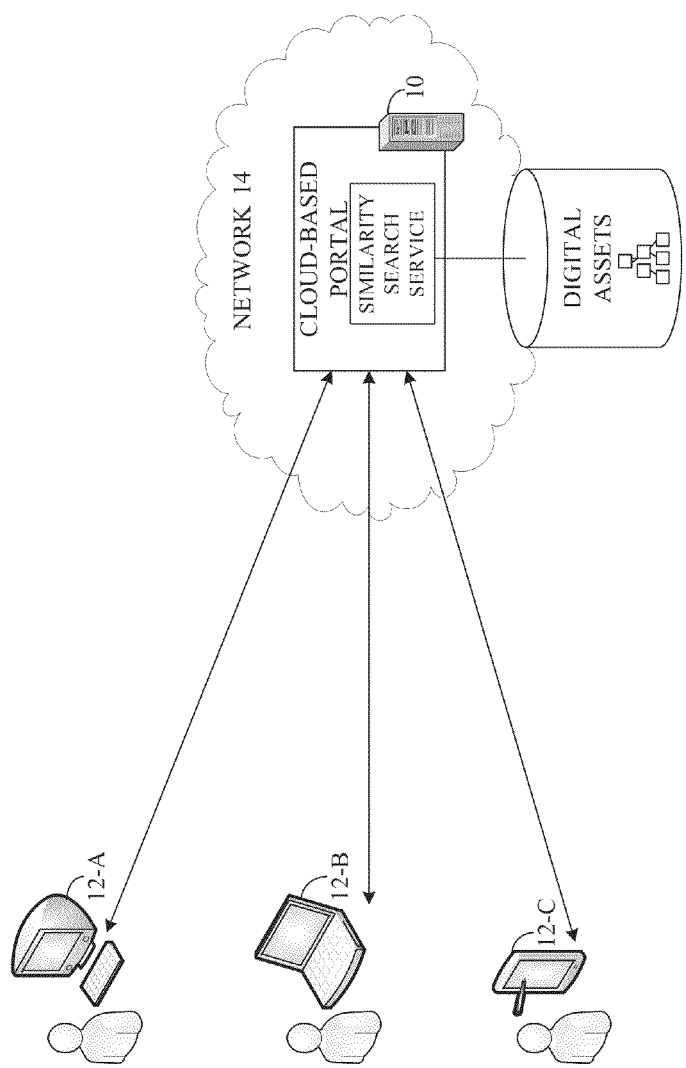
FIG. 1 is a block diagram illustrating a computer network environment in which one or more client computing devices may access a cloud-based resource providing a search functionality consistent with some embodiments of the invention.

The present disclosure describes methods, systems, and computer program products, which individually provide functionality for facilitating a similarity search to identify a set of digital assets (e.g., images, videos, audio files, etc.) that are similar to a reference or target asset. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

For purposes of the present disclosure, the term "asset" or "digital asset" refers to a digital representation of a particular type of content, such as images, photographs, video, audio, text, etc. Accordingly, a digital asset represents a particular instance of some content, typically embodied as a computer file and containing content of a particular type or format. Many of the examples presented herein are described in the context of a particular type of digital asset—specifically, images. However, skilled artisans will readily appreciate the applicability of the inventive subject matter to any number of different content or digital asset types (e.g., video, graphics, text, audio, etc.).

Various embodiments of the invention facilitate specific implementations of a particular type of search that is referred to herein as a "similarity search" (also frequently referred to as "proximity search" and/or "nearest neighbor search"). Accordingly, embodiments of the invention provide a mechanism for a user to identify a specific digital asset (e.g., an image, a video, etc.) and then perform a search of a plurality of other digital assets with the objective of identifying a subset of the digital assets that share attributes or characteristics in common with the user-selected digital asset. In the specific context of an image similarity search, the desired result is a set of images that are most similar to a user-selected image, sometimes referred to herein as a reference image.

To provide a scalable and effective cloud-based similarity search for images (or other digital assets), a variety of techniques are used. For example, with some embodiments, pattern recognition techniques are used to determine the similarity between any two digital assets. For example, each digital asset is assigned a feature vector with the set of attributes or characteristics used in determining similarity being the feature space. As such, the similarity between any two digital assets (e.g., images) can be derived by computing a measure of distance between two digital assets using the feature vectors associated with the two digital assets. In addition and as described in greater detail below, a hierarchical tree-like data structure, referred to herein generally as a search tree data structure, which in some embodiments is implemented with a graph database, is used to manage or organize the digital assets, such that digital assets that are deemed to be most similar (e.g., based on a derived measure of distance between the assets, where the distance measure is determined based on the asset's respective feature vector) are assigned to common leaf nodes in the search tree data structure. With some embodiments, multiple search tree data structures may be used. For instance, with some embodiments, a personal search tree data structure may be maintained for each user, such that the personal search tree data structure organizes the personal digital assets that are uploaded and only accessible to the particular user. Similarly, one or more group, public, or global search tree data structures may be maintained for digital assets that are accessible to multiple users, including a system-defined group of users (e.g., a particular collaborative group, all employees of a particular company, and so forth), or all users of the service. With some embodiments, different search tree data structures may be maintained for different subsets of attributes and/or characteristics making up a feature space. For example, with some embodiments, a first search tree data structure may be maintained for organizing digital assets around a first set of attributes and/or characteristics (e.g., color, size, etc.), while a second search tree data structure is maintained for organizing the digital assets around a second set of attributes (e.g., facial recognition data).

When a new digital asset (e.g., image file) is uploaded to the web-based service, a new digital asset is added to one or more search tree data structures. In particular, a unique identifier is generated for the new digital asset, and then the new digital asset is analyzed to identify various attributes or characteristics from which a feature vector is derived for the digital asset. Finally, the search tree data structure is traversed by descending the tree in a greedy fashion, for example, by selecting at each level in the tree the sibling node having the feature vector that is closest in distance to the feature vector of the new digital asset until a leaf node is reached. Once a leaf node is reached during the tree traversal process, the digital asset is assigned to the particular leaf node. More specifically, the unique identifier and the feature vector corresponding with new digital asset are assigned to the particular leaf node identifying the digital asset. By accessing the unique identifier of a digital asset assigned to a particular leaf node, the actual stored digital asset can be accessed. Because the tree is traversed in a greedy fashion, there is no guarantee that the digital asset will be assigned to the leaf node having the feature vector with the absolute closest distance to the feature vector of the new digital asset.

Over time, the number of digital assets assigned to any one particular leaf node will increase. Accordingly, with some embodiments, a background process (referred to herein as a node balancing process) monitors the number of digital assets assigned to the various leaf nodes, and when the number of digital assets assigned to a particular leaf node exceeds some defined threshold number, a defined number of new child leaf nodes are spawned for the over capacity leaf node. With some embodiments, a clustering algorithm is used to assign a virtual feature vector to each new child leaf node that is spawned. Each virtual feature vector to be assigned to a new child leaf node is derived by clustering the feature vectors of the particular digital assets that are assigned to the over capacity leaf node. Once a cluster center (e.g., a virtual feature vector) is derived for each new leaf node, the new leaf nodes are attached or assigned to the original (over capacity) leaf node. Finally, the digital assets that were initially assigned to the original (over capacity) leaf node are reassigned to the closest new child leaf node, where the distance between a digital asset and any particular child leaf node is based on the feature vector of the digital asset and the virtual feature vector of the particular new child leaf node.

When a user specifies a particular digital asset (e.g., an image) and requests to identify similar digital assets, a similarity search is performed. With some embodiments, the similarity search is performed by doing a prioritized breadth-first search of the search tree data structure to identify a certain number of digital assets that are closest in distance to the reference digital asset, based on a comparison of their respective feature vectors. Due to the high-dimensionality of the feature space, not all neighbors (i.e., similar digital assets) will be connected to the same leaf node. Accordingly, the prioritized breadth-first search will analyse the digital assets assigned to many leaf nodes and will ultimately result in identifying similar digital assets, even when the resulting similar assets are assigned to a leaf node different from the leaf node to which the reference or target digital asset is assigned. Other aspects and advantages of the inventive subject matter will be readily apparent to those skilled in the art from the description of the figures that follows.

FIG. 1 is a block diagram illustrating a computer network environment in which one or more client-computing devices may access a cloud-based resource providing search functionality consistent with some embodiments of the invention. As illustrated in FIG. 1, with some embodiments, one or more network-connected servers 10 are accessible to any number of client-computing devices 12-A, 12-B and 12-C via the network 15. Although illustrated in FIG. 1 as a single server computer 10, the server may be part of a cluster of servers such that the various functions described herein may be performed collectively by the cluster of servers.

With some embodiments, the cloud-based portal may provide any number of services and/or functions in addition to a similarity search service. For example, the cloud-based portal may operate in conjunction with one or more applications residing on a client-computing device to facilitate any one or more of a file storage service, a document management service, a document editing service, an image, video, and/or audio editing and/or publication tool. The similarity search service may operate as a standalone application or tool, or, as an integrated component or feature of any one of the many applications and/or services provided by the cloud-based portal.

With some embodiments of the invention, users will upload digital assets (e.g., an image file, a video file, an audio file, or a document) to store them at a storage service associated with the cloud-based portal. Accordingly, over time, with many users uploading different digital assets, the collection of digital assets may grow to be extremely large. As described in greater detail below, when a user uploads a digital asset to the server with reference number 10, the digital asset is processed and stored. Specifically, a unique identifier for the digital asset is generated and associated with the digital asset. In addition, the digital asset and any associated meta-data are analyzed to identify a variety of attributes and/or characteristics that comprise the feature space—that is, the set of attributes and characteristics used in determining the similarity between digital assets. Once identified, the attributes and/ or characteristics are used to generate for the digital asset a feature vector—an N-dimensional vector of features, typically coded numerically, and representative of the digital asset. After generating the feature vector for the digital asset, the digital asset (specifically, the unique identifier assigned to the digital asset) is associated with a leaf node of a search tree data structure. For example, the search tree data structure is traversed to identify the leaf node having the nearest (in distance) feature vector. The digital asset is then assigned to the leaf node having the nearest feature vector. As described below, by assigning each digital asset to a leaf node in this manner, a similarity search can be efficiently performed to identify digital assets that are most similar to a reference (e.g., user-selected) digital asset.

Figure 2:
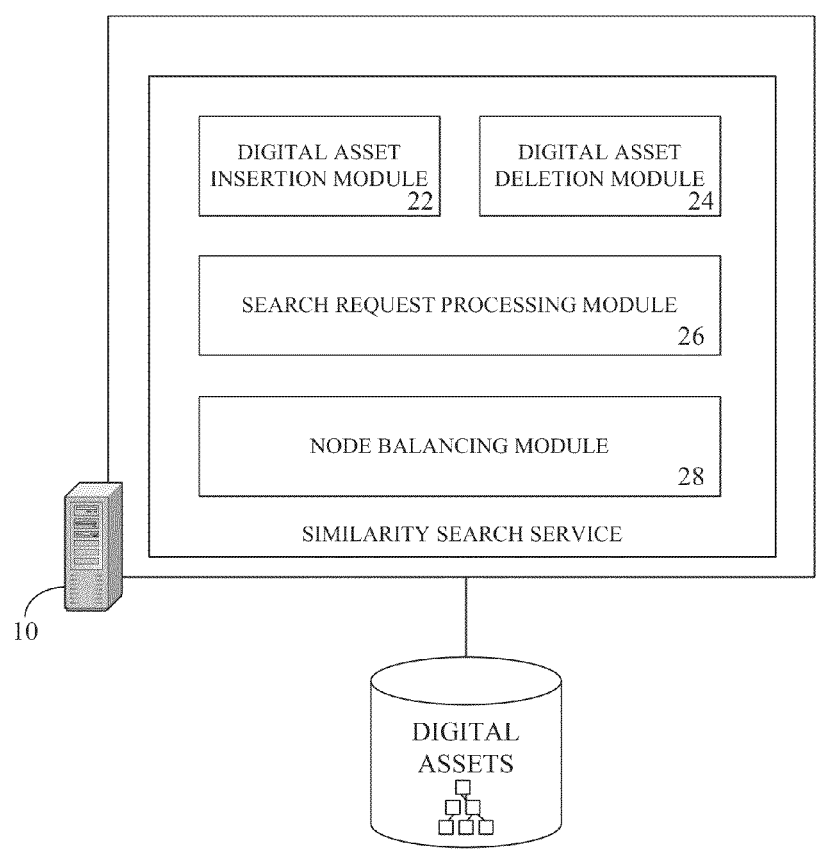
FIG. 2 is a block diagram illustrating the functional modules of a cloud-based similarity search service implemented with one or more servers and consistent with some embodiments of the invention.

FIG. 2 is a block diagram illustrating the functional modules of a cloud-based service implemented with one or more servers and having a similarity search service consistent with some embodiments of the invention. Referring now to FIG. 2, the cloud-based search service enables a user to add (upload and store) a digital asset, delete a digital asset, and search for digital assets similar to a reference digital asset. Accordingly, the search service includes a digital asset insertion module 22, a digital asset deletion module 24, and a search request processing module 26. In addition, a node balancing module analyzes and processes the one or more search tree data structures to ensure that the allocation of digital assets to the various leaf nodes is balanced. Although not explicitly shown in FIG. 2, the digital asset insertion module includes logic to analyze digital assets for the purpose of identifying their attributes and/or characteristics and generating a corresponding feature vector for the digital asset. With some embodiments, the digital asset insertion process, the digital asset search process, and the digital asset deletion process are separate and distinct processes that can operate concurrently to simultaneously service multiple requests of the same, as well as different types. The node balancing process is a singleton task executing in the background.

Figure 3:
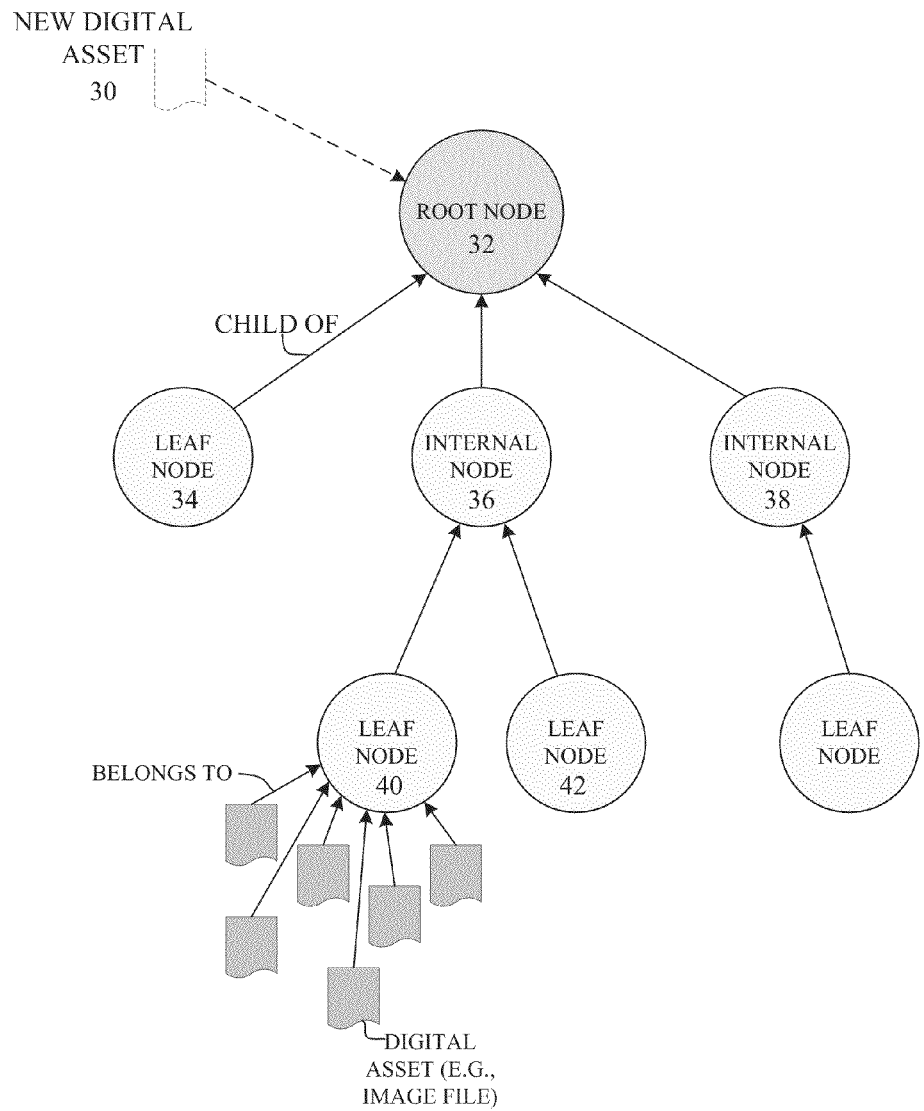
FIG. 3 is a diagram illustrating a search tree data structure for use with a similarity search service, consistent with some embodiments of the invention.

FIG. 3 is a diagram illustrating a search tree data structure for use with a similarity search service, consistent with embodiments of the invention. For example, with some embodiments, when a digital asset is initially uploaded to the cloud-based portal for storage, the digital asset is assigned a unique identifier. In addition, the digital asset is analyzed to identify a set of attributes and/or characteristics with which a feature vector is derived. The feature vector is a compact representation of the various attributes and characteristics of the particular digital asset. Using known techniques, the feature vectors for two different digital assets can be analysed to derive a measure of distance between the feature vectors, and thus, a measure of similarity between the two digital assets.

After a newly uploaded digital asset is analysed to generate a feature vector, the digital asset is added to one or more search tree data structures. For instance, as shown in FIG. 3, the new digital asset with reference number 30 is being added to the search tree data structure with the root node having reference number 32. In this case, the feature vector associated with the new digital asset 30 will be compared with the virtual feature vectors associated with each of leaf node 34, internal node 36 and internal node 38. If, for example, the feature vector of the new digital asset 30 is closest in distance to the virtual feature vector associated with the internal node with reference number 36, then the search tree will be traversed by further comparing the feature vector of the new digital asset 30 with the virtual feature vectors associated with the leaf nodes having reference numbers 40 and 42. Assuming for the sake of this example that the feature vector of the new digital asset 30 is closer in distance to the leaf node with reference number 42 than the leaf node with reference number 40 and leaf node 34 and internal node 38, then the new digital asset 30 will be assigned to the leaf node with reference number 42. In this manner, digital assets are generally clustered or organized such that digital assets that are similar (e.g., have smaller distances between their respective feature vectors) will tend to be assigned to the same leaf nodes.

Figure 4:
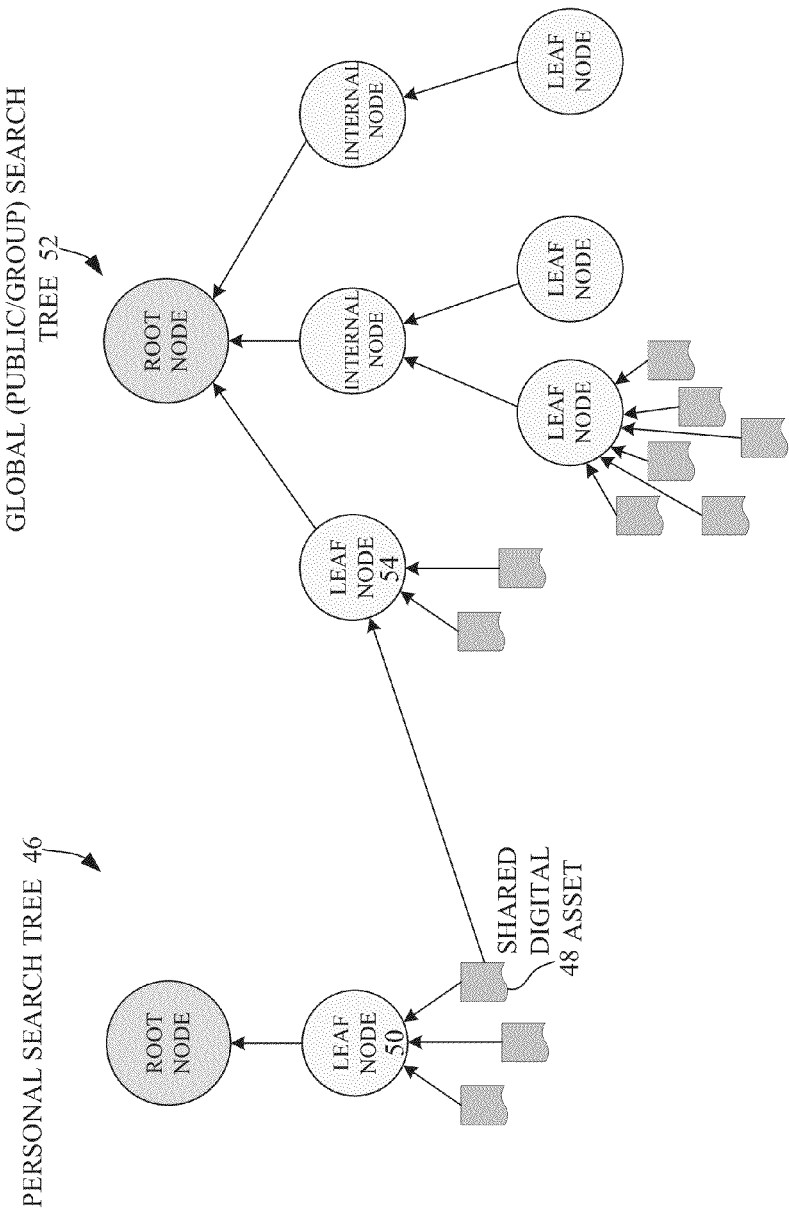
FIG. 4 is a diagram illustrating both a personal search tree data structure and a global search tree data structure, both for use with a similarity search service consistent with some embodiments of the invention.

FIG. 4 is a diagram illustrating both a personal search tree data structure 46 and a global search tree data structure 52, both for use with a similarity search service consistent with some embodiments of the invention. With some embodiments, a new digital asset may first be assigned to a leaf node of a personal search tree. If and when the user who has uploaded the new digital asset makes a change to the access privileges for the digital asset (e.g., by sharing the digital asset with another user, a group of users, or the public in general), the shared digital asset will be added to one or more additional search trees. For instance, as illustrated in FIG. 4, the shared digital asset with reference number 48 is associated with a leaf node 50 of the personal search tree with reference number 46 and a leaf node 54 of the global search tree with reference number 52. Because the digital asset is stored in association with a unique identifier, assigning the digital asset to a leaf node of more than one search tree is as simple as assigning the unique identifier to the one or more search trees, and thereby eliminating the need to have multiple copies of the actual digital asset in storage.

With some embodiments, a digital asset may be added to multiple search tree data structures with each search tree data structure being designated for use with a different feature space. For instance, in the case of an image similarity search service, one search tree may be used to organize digital assets (e.g., images) based on specific attributes and/or characteristics that are used for facial recognition techniques, while another search tree may be used for organizing the same set of digital assets based on other attributes, such as color, size, etc.

Figure 5:
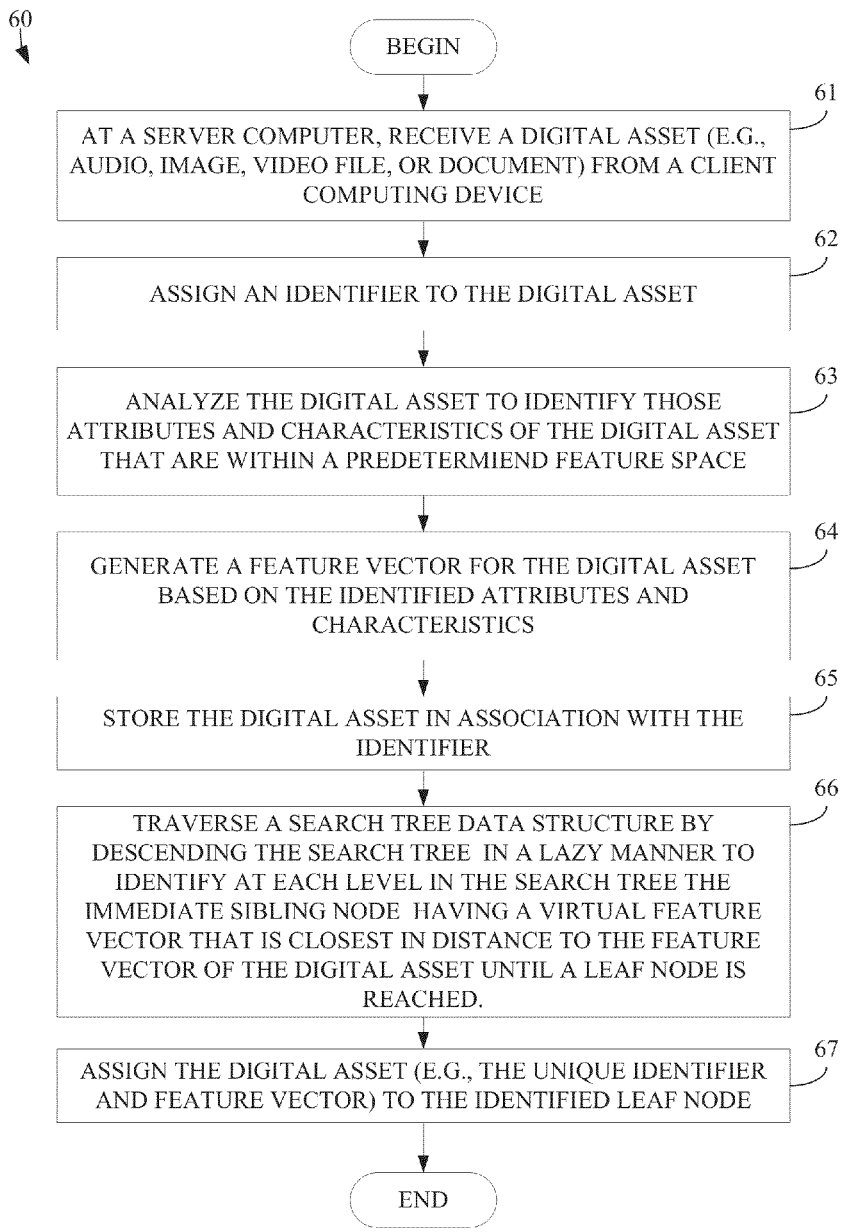
FIG. 5 is a flow diagram illustrating the method operations for processing a digital asset when it is initially uploaded or otherwise provided to a server operating a similarity search service according to some embodiments of the invention.

FIG. 5 is a flow diagram illustrating the method operations for processing a digital asset when it is initially uploaded or otherwise provided to a server operating a similarity search service according to some embodiments of the invention. As illustrated in FIG. 5, the method generally begins when a user, using a client-computing device (e.g., a desktop, tablet or mobile computing device), interacts with a cloud-based portal to invoke a request to have a digital asset, such as an image file, uploaded to be stored at a server of the cloud-based portal. Accordingly, at method operation 61, the server receives a digital asset from the client-computing device. Next, at method operation 62, an identifier is assigned to the digital asset. At method operation 63, the digital asset is analyzed to identify its attributes and characteristics that are within one or more feature spaces associated with one or more search trees. At method operation 64, a feature vector for the digital asset is generated. Alternatively, more than one feature vector may be generated. At method operation 65, the digital asset is stored in association with the identifier that has been assigned. This allows the digital asset to be retrieved from storage based on its unique identifier. At method operation 66, the digital asset is inserted into the search tree. To insert the digital asset into the search tree, the search tree is traversed by descending the search tree in a greedy manner to identify at each level in the search tree the immediate sibling node having the virtual feature vector that is closest in distance to the feature vector of the digital asset until a leaf node is reached. Finally, upon reaching a leaf node while descending the search tree, at method operation 67, the digital asset is assigned to the first leaf node reached during the tree traversal. In particular, the unique identifier and the feature vector of the digital asset are assigned to the leaf node.

Figure 6:
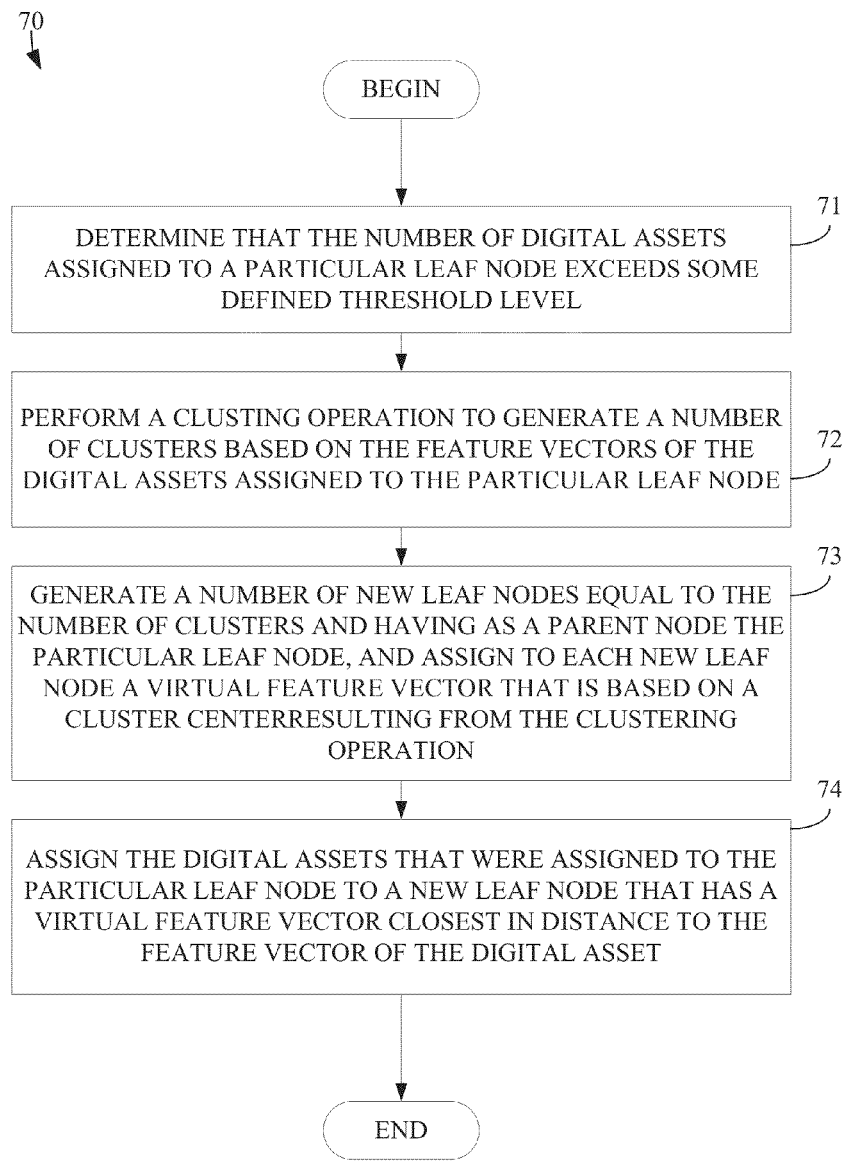
FIG. 6 is a flow diagram illustrating the method operations performed during a node balancing operation according to some embodiments of the invention.

FIG. 6 is a flow diagram illustrating the method operations performed during a node balancing operation according to some embodiments of the invention. To keep the search tree data structure from becoming unbalanced, a housekeeping process referred to generally herein as a node balancing process is performed. At method operation 71, the server (e.g., node balancing module 28 in FIG. 2) determines that the number of digital assets assigned to a particular leaf node has exceeded some defined threshold level. Accordingly, at method operation 72, a cluster operation is performed to generate a number of clusters based on the feature vectors of the digital assets assigned to the over capacity leaf node. Next, at method operation 73, a number of new nodes are generated and assigned virtual feature vectors to correspond with the cluster centers generated by the clustering operation. Finally, the digital assets that were initially assigned to the over capacity leaf node are now re-assigned to one of the new leaf nodes having the virtual feature vector that is closest in distance to the feature vector of the respective digital asset.

Figure 7:
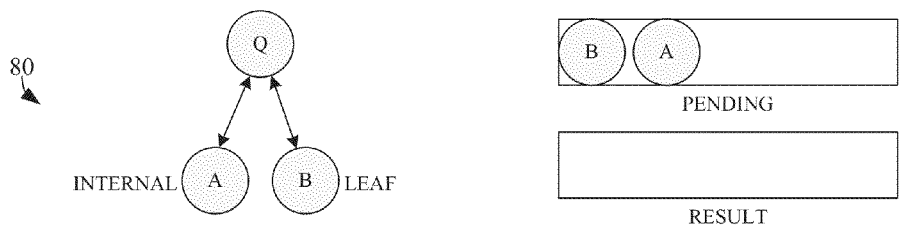
FIG. 7 is a block diagram illustrating the method operations that occur during a prioritized, breadth first search of a search tree data structure, consistent with some embodiments of the invention.
Figure 7:
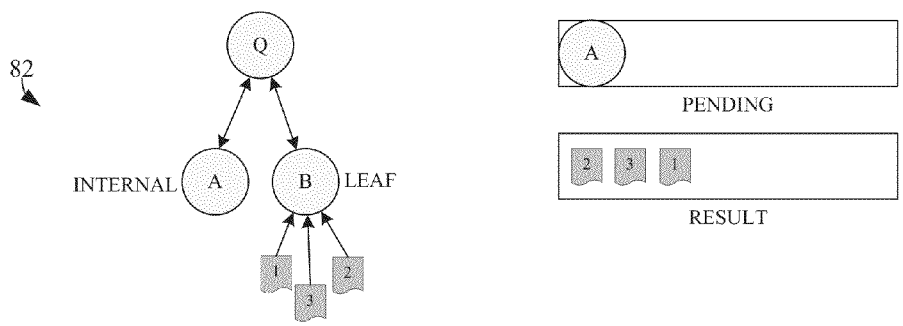
Figure 7:
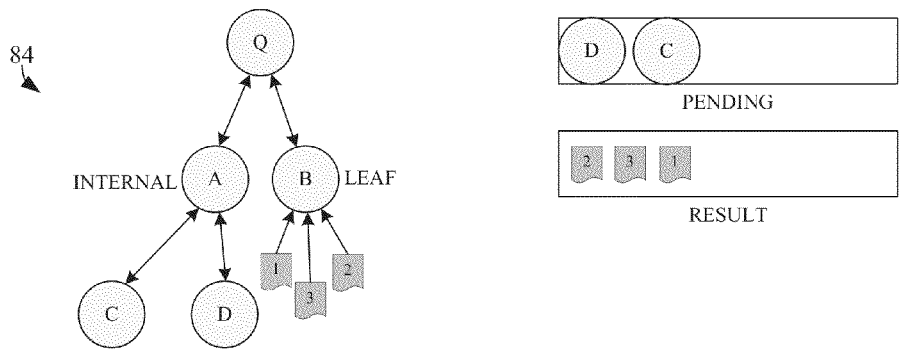

FIG. 7 is a block diagram illustrating the method operations that occur during a prioritized, breadth first search of a search tree data structure, consistent with some embodiments of the invention. For example, when a search for similar digital assets is performed, the search tree is traversed to identify the leaf nodes that are close (in terms of feature vectors) to the reference asset. This is done by choosing the closest node in the priority queue "PENDING" in FIG. 7. The digital assets assigned to said leaf nodes are then analyzed and added to a result queue, and then sorted based on distance. The next closest node in the "PENDING" queue is then identified. If this next node is a leaf node, then it is similarly processed by adding the digital assets assigned to the leaf node to the result queue, and then ordering all assets in the result queue based on distance. If the next node is instead an internal node, then the distance of the reference asset to each of the child nodes is evaluated, and the child nodes are added to the "PENDING" queue, and the "PENDING" queue is then sorted according to distance. In this manner, the digital assets having the feature vectors likely to be close in distance to the feature vector of the reference digital asset are identified quickly and efficiently.

As illustrated in FIG. 7 with reference number 80, with both A and B in the pending queue, the node with letter Q is compared against leaf node B and internal node A. Specifically, the feature vector corresponding with the reference digital asset (e.g., Q) is compared to the virtual feature vectors assigned to nodes A and B. In this example, node B is closer. Accordingly, as shown in connection with reference 82, node B is expanded and the digital assets assigned to node B are analyzed. Specifically, the distance between node Q and digital assets 1, 2 and 3 is determined, added to the result queue, and then ordered. As shown in this example, the digital asset with reference number 2 is closest in distance to Q, and is therefore listed first in the result queue. Next, the next node in the pending queue is expanded, and the closest sibling node is visited. For instance, as shown in connection with reference number 84, nodes D and C are added to the pending queue with D listed first to indicate that D is closer than C to the feature vector of the reference asset. In this manner, the nodes of the search tree are visited, and the digital assets most similar to the reference asset are identified and ordered.

Figure 8:
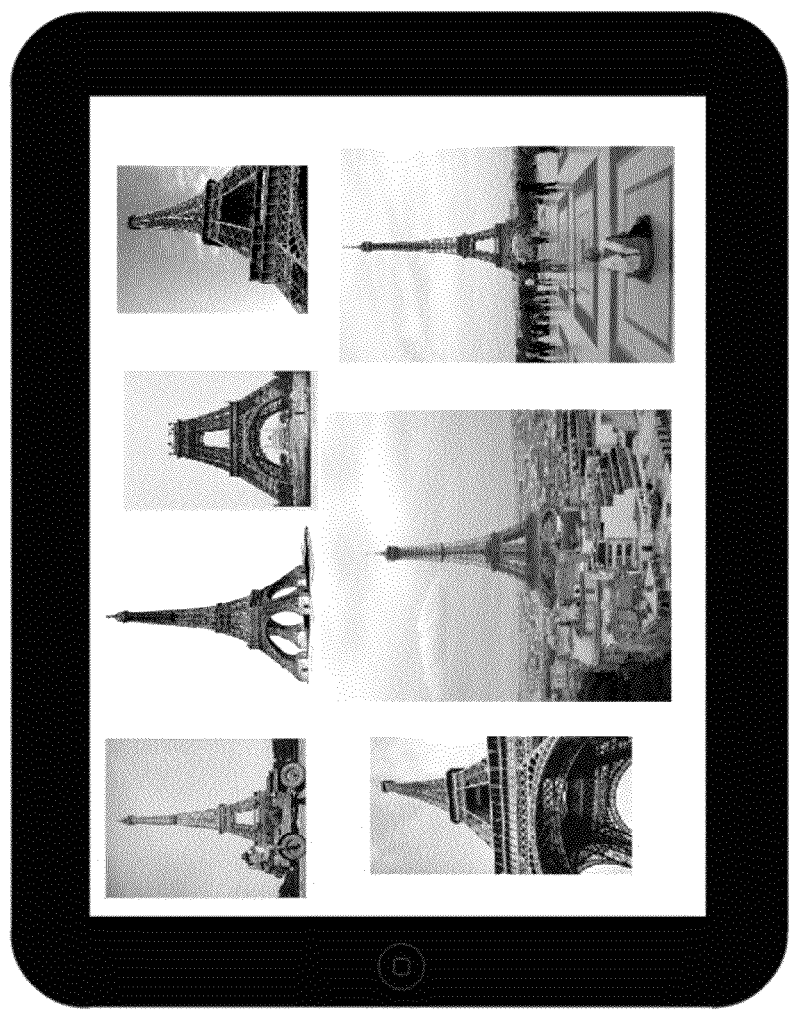
FIG. 8 is an example of a user interface for a tablet-based computing device of an image similarity search service, consistent with some embodiments of the invention.

FIG. 8 is an example of a user interface for a tablet-based computing device of an image similarity search service, consistent with some embodiments of the invention. As shown in FIG. 8, a search has been performed to identify images similar to a reference image in the form of a picture of the Eiffel Tower.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 9:
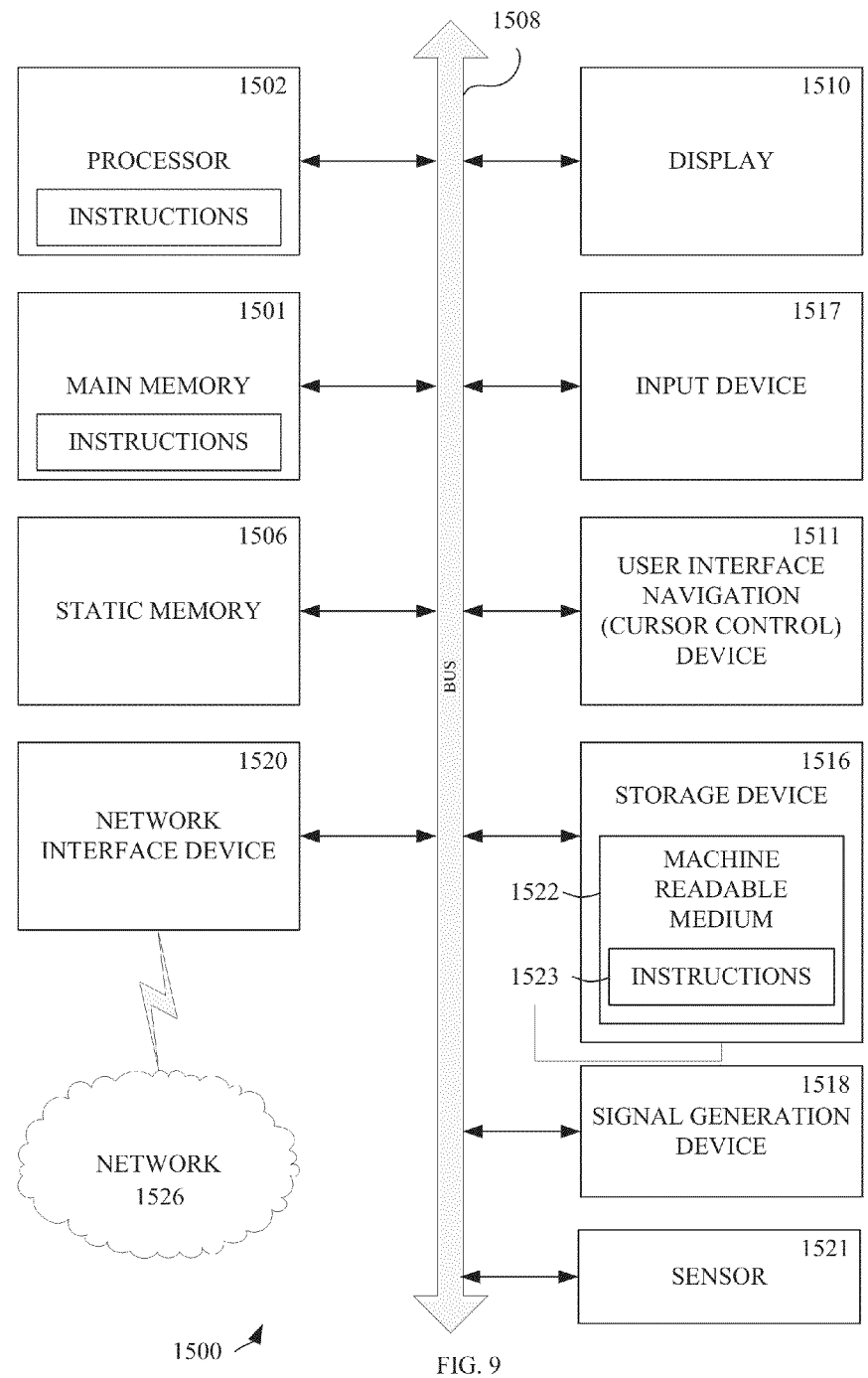
FIG. 9 is a block diagram of a machine in the form of a computing device within which a set of instructions, for causing the machine to perform any one or more of the methodologies discussed herein, may be executed.

FIG. 9 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
    at a server computer accessible via a data network to a plurality of client computing devices, receiving a first digital asset from one of the plurality of client computing devices over the data network;
    generating a first feature vector and a unique identifier for the first digital asset;
    determining a first search tree leaf node of a first search tree data structure maintained at the server computer is associated with a second feature vector that is close in distance to the first feature vector generated for the first digital asset, wherein the second feature vector is associated with a second digital asset;
    based on determining the first search tree leaf node is associated with the second feature vector that is close in distance to the first feature vector, assigning the first feature vector and the unique identifier for the first digital asset to the first search tree leaf node, wherein the first digital asset is added to a second search tree data structure maintained at the server computer by assigning the unique identifier for the first digital asset to a second search tree leaf node of the second search tree data structure; and
    storing the first digital asset in association with the unique identifier, wherein the first digital asset is retrievable from storage based on a retrieval request comprising the unique identifier.

2. The computer-implemented method of claim 1, wherein determining the first search tree leaf node is associated with the second feature vector that is close in distance to the first feature vector generated for the first digital asset comprises:
    traversing a root node, one or more internal nodes, and one or more leaf nodes of the first search tree data structure to identify the first search tree leaf node associated with the second feature vector that, at a level of the first search tree data structure, is closest in distance to the first feature vector generated for the first digital asset.

3. The computer-implemented method of claim 1, wherein the first search tree data structure is a personal search tree data structure, the method further comprising:
    assigning the first feature vector and the unique identifier for the first digital asset to the second search tree leaf node of the second search tree data structure maintained at the server computer, the second search tree data structure is i) a search tree data structure for organizing digital assets accessible to a group of users, and ii) implemented with a highly scalable graph database and having a root node, one or more internal nodes, and one or more leaf nodes to which the digital assets are assigned.

4. The computer-implemented method of claim 3, wherein assigning the first feature vector and the unique identifier for the first digital asset to the second search tree leaf node comprises:
    traversing the root node, the one or more internal nodes, and the one or more leaf nodes of the second search tree data structure to identify a particular leaf node with an assigned feature vector that is close in distance to the first feature vector generated for the first digital asset; and
    assigning the first feature vector and the unique identifier for the first digital asset to the particular leaf node of the second search tree data structure.

5. The computer-implemented method of claim 1, further comprising:
    responsive to determining that a number of digital assets assigned to a particular leaf node of the first search tree data structure is equal to or greater than a threshold number, performing a clustering algorithm to generate a plurality of clusters based on feature vectors of the digital assets assigned to the particular leaf node, each of the plurality of clusters having as a center a new feature vector that is derived based on the feature vectors of the digital assets assigned to the particular leaf node;

converting the particular leaf node into an internal node by generating a new leaf node for each of the plurality of clusters, resulting in a plurality of new leaf nodes, and assigning each of the plurality of new leaf nodes to the particular leaf node; and assigning each digital asset that was assigned to the particular leaf node to at least one of the plurality of new leaf nodes, the at least one of the plurality of new leaf nodes having a feature vector that is closest in distance to the feature vector of the respective digital asset.

6. The computer-implemented method of claim 1, further comprising:

receiving a search request for digital assets that are similar to a third digital asset;

based on the first feature vector for the first digital asset and a third feature vector for the third digital asset, determining that the first digital asset is similar to the third digital asset;

retrieving the first digital asset from storage based on the retrieval request comprising the unique identifier; and providing the first digital asset in response to the search request.

7. The computer-implemented method of claim 6, wherein the search request specifies a particular group and a prioritized breadth first search is performed to identify only those digital assets having access privileges defined to allow members of the particular group access.

8. A system comprising:

a processor for executing instructions comprising computer code;

a memory device in communication with the processor, the memory device for storing instructions executable by the processor;

computer code to receive a first digital asset from a client computing device over a data network;

computer code to generate a first feature vector and a unique identifier for the first digital asset;

computer code to determine a first search tree leaf node of a first search tree data structure is associated with a second feature vector that is closest in distance to the first feature vector generated for the first digital asset, wherein the second feature vector is associated with a second digital asset;

computer code to assign the first feature vector and the unique identifier for the first digital asset to the first search tree leaf node based on determining the first search tree leaf node is associated with the second feature vector that is closest in distance to the first feature vector, wherein the unique identifier for the first digital asset is further useable to add the first digital asset to a second search tree data structure, wherein adding the first digital asset to the second search tree data structure comprises assigning the unique identifier for the first digital asset to a second search tree leaf node of the second search tree data structure; and computer code to store the first digital asset in association with the unique identifier, wherein the first digital asset is retrievable from storage based on a retrieval request comprising the unique identifier.

9. The system of claim 8, further comprising:

computer code to traverse a root node, one or more internal nodes, and one or more leaf nodes of the first search tree data structure to identify the first search tree leaf node associated with the second feature vector that, at a level of the first search tree data structure, is closest in distance to the first feature vector generated for the first digital asset.

10. The system of claim 8, wherein the first search tree data structure is a personal search tree data structure, the system further comprising:

computer code to assign the first digital asset to the second search tree leaf node of the second search tree data structure, the second search tree data structure is i) a search tree data structure for organizing digital assets accessible to a group of users, and ii) implemented with a highly scalable graph database and having a root node, one or more internal nodes, and one or more leaf nodes to which the digital assets are assigned.

11. The system of claim 10, further comprising:

computer code to traverse the root node, the one or more internal nodes, and the one or more leaf nodes of the second search tree data structure to identify a particular leaf node with an assigned feature vector that is closest in distance to the first feature vector generated for the first digital asset; and assigning the first digital asset to the particular leaf node of the second search tree data structure.

12. The system of claim 10, further comprising computer code to:

responsive to determining that a number of digital assets assigned to a particular leaf node of the first search tree data structure is equal to or greater than a threshold number, perform a clustering algorithm to generate a plurality of clusters based on feature vectors of the digital assets assigned to the particular leaf node, each of the plurality of clusters having as a center a new feature vector that is derived based on the feature vectors of the digital assets assigned to the particular leaf node;

convert the particular leaf node into an internal node by generating a new leaf node for each of the plurality of clusters, resulting in a plurality of new leaf nodes, and assigning each of the plurality of new leaf nodes to the particular leaf node; and assign each digital asset that was assigned to the particular leaf node to at least one of the plurality of new leaf nodes, the at least one of the plurality of new leaf nodes having a feature vector that is closest in distance to the feature vector of the respective digital asset.

13. The system of claim 8, further comprising:

computer code to receive a search request for digital assets that are similar to a third digital asset;

computer code to determine that the first digital asset is similar to the third digital asset based on the first feature vector for the first digital asset and a third feature vector for the third digital asset;

computer code to retrieve the first digital asset from storage based on the retrieval request comprising the unique identifier; and providing the first digital asset in response to the search request.

14. The system of claim 13, wherein the search request specifies a particular group and a prioritized breadth first search is performed to identify only those digital assets having access privileges defined to allow members of the particular group access.

15. A computer-readable storage medium storing executable instructions thereon, which, when executed by a processor of a server computer, cause the server computer to:

receive a first digital asset;

generate a first feature vector and a unique identifier for the first digital asset;

based on the first feature vector for the first digital asset and a second feature vector for a second digital asset, wherein the second feature vector is associated with a first search tree leaf node of a first search tree data structure maintained at the server computer, determine the first digital asset is to be associated with the first search tree leaf node;

based on determining the first digital asset is to be associated with the first search tree leaf node, assign the first feature vector and the unique identifier for the first digital asset to the first search tree leaf node, wherein the unique identifier is further useable to add the first digital asset to a second search tree data structure, wherein adding the first digital asset to the second search tree data structure comprises assigning the unique identifier for the first digital asset to a second search tree leaf node of the second search tree data structure; and store the first digital asset in association with the unique identifier, wherein the first digital asset is retrievable from storage based on a retrieval request comprising the unique identifier.

16. The computer-readable storage medium of claim 15, further comprising executable instructions which, when executed by the processor of the server computer, cause the server computer to:

traverse a root node, one or more internal nodes, and one or more leaf nodes of the first search tree data structure to identify the first search tree leaf node associated with the second feature vector that, at a level of the first search tree data structure, is closest in distance to the first feature vector generated for the first digital asset.

17. The computer-readable storage medium of claim 15, further comprising executable instructions which, when executed by the processor of the server computer, cause the server computer to:

assign the first digital asset to the second search tree leaf node of the second search tree data structure, wherein the second search tree data structure is maintained at the server computer and the second search tree data structure is i) a search tree data structure for organizing digital assets accessible to a group of users, and ii) implemented with a highly scalable graph database and having a root node, one or more internal nodes, and one or more leaf nodes to which the digital assets are assigned.

18. The computer-readable storage medium of claim 17, further comprising executable instructions which, when executed by the processor of the server computer, cause the server computer to:

traverse the root node, the one or more internal nodes, and the one or more leaf nodes of the second search tree data structure to identify a particular leaf node with an assigned feature vector that is closest in distance to the first feature vector generated for the first digital asset; and assign the first digital asset to the particular leaf node of the second search tree data structure.

19. The computer-readable storage medium of claim 15, further comprising executable instructions which, when executed by the processor of the server computer, cause the server computer to:

responsive to determining that a number of digital assets assigned to a particular leaf node of the first search tree data structure is equal to or greater than a threshold number, perform a clustering algorithm to generate a plurality of clusters based on feature vectors of the digital assets assigned to the particular leaf node, each of the plurality of clusters having as a center a new feature vector that is derived based on the feature vectors of the digital assets assigned to the particular leaf node;

convert the particular leaf node into an internal node by generating a new leaf node for each of the plurality of clusters, resulting in a plurality of new leaf nodes, and assigning each of the plurality of new leaf nodes to the particular leaf node; and assign each digital asset that was assigned to the particular leaf node to at least one of the plurality of new leaf nodes, the at least one of the plurality of new leaf nodes having a feature vector that is closest in distance to the feature vector of the respective digital asset.

20. The computer-readable storage medium of claim 15, further comprising executable instructions which, when executed by the processor of the server computer, cause the server computer to:

receive a search request for digital assets that are similar to a third digital asset;

perform a prioritized breadth first search to identify digital assets assigned to leaf nodes of the first search tree data structure having feature vectors that are closest in distance to a third feature vector for the third digital asset; and retrieve the identified digital assets from storage based on one or more retrieval requests comprising unique identifiers for the identified digital assets.

21. The computer-readable storage medium of claim 20, wherein the search request specifies a particular group and the prioritized breadth first search is performed to identify only those digital assets having access privileges defined to allow members of the particular group access.

* * * * *